(12) United States Patent
Zohar et al.

(10) Patent No.: US 7,395,391 B2
(45) Date of Patent: Jul. 1, 2008

(54) PARALLEL ASYNCHRONOUS ORDER-PRESERVING TRANSACTION PROCESSING

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: XIV Ltd., Tel-Aviv (IL)

( * ) Notice: Subject to any disclaimer, the term of this patent is extended or adjusted under 35 U.S.C. 154(b) by 0 days.

(21) Appl. No.: 11/756,729

(22) Filed: Jun. 1, 2007

(65) Prior Publication Data

US 2007/0226230 A1   Sep. 27, 2007

Related U.S. Application Data

(63) Continuation of application No. 10/701,800, filed on Nov. 5, 2003.

(51) Int. Cl.
*G06F 12/00* (2006.01)
(52) U.S. Cl. ............... 711/162; 711/112; 711/114; 711/163; 707/10; 707/204
(58) Field of Classification Search .............. 711/162
See application file for complete search history.

(56) References Cited

U.S. PATENT DOCUMENTS

| | | | |
|---|---|---|---|
| 5,222,219 A | 6/1993 | Stumpf et al. | |
| 5,261,051 A * | 11/1993 | Masden et al. | ............ 711/152 |
| 5,742,792 A | 4/1998 | Yanai et al. | |
| 5,900,020 A | 5/1999 | Safranek et al. | |
| 6,493,809 B1 | 12/2002 | Safranek et al. | |
| 6,502,205 B1 | 12/2002 | Yanai et al. | |
| 6,697,960 B1 | 2/2004 | Clark et al. | |
| 6,934,766 B1 * | 8/2005 | Russell | ............ 709/246 |
| 6,934,877 B2 | 8/2005 | Tamatsu | |
| 7,181,731 B2 * | 2/2007 | Pace et al. | ............ 717/136 |
| 7,191,442 B2 * | 3/2007 | Lamkin et al. | ............ 718/100 |
| 2004/0250029 A1 * | 12/2004 | Ji et al. | ............ 711/162 |

OTHER PUBLICATIONS

Minwen, Ji, et al. Seneca: Remote Mirroring Done Write, Proceedings of USENIX Technical Conference, pp. 253-268, Jun. 2003, San Antonio, Texas.

* cited by examiner

*Primary Examiner*—Kevin Ellis
*Assistant Examiner*—Hashem Farrokh
(74) *Attorney, Agent, or Firm*—Katten Muchin Rosenman LLP (57) ABSTRACT

A method for data mirroring including receiving a sequence of transactions at a first storage node from a host indicating data to be stored by the node, storing the data therein, and delineating a first batch of the transactions. The node returns to the host an acknowledgment of having stored the data, delineates a second batch of the transactions received subsequent to the acknowledgment, and conveys the data to a second storage node. The first node also conveys to the second node a first record of the transactions in the first batch and a second record of the transactions in the second batch, and the data are stored in the second node responsively to the first and second records, so that all data indicated by the transactions in the first batch are stored by the second node prior to storing data indicated by the transactions in the second batch.

20 Claims, 2 Drawing Sheets

FIG. 1

PARALLEL ASYNCHRONOUS ORDER-PRESERVING TRANSACTION PROCESSING

FIELD OF THE INVENTION

The present invention relates generally to data transaction processing, and specifically to processing of ordered data transactions, for instance in a redundant system, such as a remote-mirrored storage system.

BACKGROUND OF THE INVENTION

A data transaction, also termed herein a transaction, comprises a unit of work, initiated with a request and completed with a response, which in turn comprises one or more operations. Each operation may have associated data, and a typical transaction comprises an operation where data is read or modified. Combinations of transactions may or may not be ordered. For example, consider a host that intends to move data D from cell X to cell Y in a database of a primary device. This involves three database transactions, with associated modifications of data, in the device:

A: Generate a log indicating the intention to perform B and C.
B: erase D from X.
C: write D in Y.

It is assumed that transactions B and C will not be initiated until A has been completed and acknowledged. Further, it is also assumed that it makes no difference which of the two, B or C, is completed first. Thus, data associated with transaction A (i.e., the log) must be processed before data of B or C are processed whereas in the relation between B and C there is no such requirement.

The above example is illustrative of a general property of any transactions M and N. M and N may be ordered with respect to each other, i.e., M must complete prior to N or N must complete prior to M. Alternatively, the transactions are not ordered, i.e., it is immaterial which of M and N complete first. An ordered tuple convention used herein for transactions, is that if M, N, P are ordered transactions then they are written as $(M,N,P)_o$, so that M must be completed before N, and N before P. In this case $(M,N,P)_o \neq (N,M,P)_o$. If M, N, P are not ordered transactions, then they are written $(M,N,P)_{no}$, and $(M,N,P)_{no} = (N,M,P)_{no}$.

Returning to the database example, if transactions A, B, and C are also mirrored in a secondary device, then it is absolutely necessary that the required order be preserved in the secondary device, so that data associated with A must be stored before data of B or C. Once A has completed, then B or C may be committed. If the necessary order is not preserved in the secondary system, then inconsistent situations will occur in the case of a failure of either the primary or the secondary device. An order-preserving, redundant system will ensure that ordered transactions are committed in exactly the same order in both the primary and the secondary device.

For a system comprising a host coupled to a primary and a secondary device (or more generally, for committing transactions across components of a transaction processing system), there are two basic order-preserving methods known in the art: synchronous methods and asynchronous methods.

In the synchronous approach, the primary device receives a transaction from the host. The primary device gives no acknowledgment of the transaction to the host until the primary device has completed the transaction, the secondary device has also completed the transactions, and, finally, the primary device has received an acknowledgment of the completion from the secondary device. Only then is the primary device allowed to acknowledge completion of the transaction to the host. Synchronous methods are inherently order-preserving, regardless of the need for order in transactions being processed on the devices. Synchronous methods are also inherently scalable, because the system can process several non-ordered requests in parallel and therefore the overall throughput is not generally affected. However, synchronous methods known in the art impose heavy penalties of latency on any system using them, since the primary device must wait for the secondary device to process and acknowledge the transaction.

Asynchronous methods allow the primary device to acknowledge the transaction to the host independently of acknowledgment from the secondary device, and thus inherently solve the latency problem of synchronous methods. However, since asynchronous methods are inherently non-order preserving, an order-preserving mechanism must be introduced into systems using these methods.

One known order-preserving mechanism is for the primary device to process and acknowledge transactions as they are received from the host. After each transaction acknowledgment has been sent, the transaction is placed in a queue for transmission to the secondary device, and the secondary device processes the queued transactions strictly according to the queued order. While this approach solves latency problems of the primary device, it introduces latency problems in the secondary device, which decreases the overall performance of the system. Furthermore, since there is no parallel processing of transactions in the secondary device, the overall system is not scalable.

A second order-preserving mechanism uses a "point in time" copy system. At some time $t_0$ a process for creating a copy of a volume $V_0$ of the primary device is initiated, and it is completed at time $t_1$. The primary device then commits the copy to the secondary device, and if the commitment completes, the secondary device has a coherent image of $V_0$ as it existed at $t_0$ in the primary device. Such a mechanism allows parallel processing of requests, and is consistent in the case of failure. However, the time lag between consecutive images at the secondary device may be relatively long, so that the amount of data lost on failure may be correspondingly large.

An article titled "Seneca: Remote Mirroring Done Write" by Minwen Ji et al., in *Proceedings of USENIX Technical Conference* (San Antonio, Tex.), pages 253-268, published in June 2003, which is incorporated herein by reference, describes a taxonomy for remote mirroring.

U.S. Pat. No. 5,222,219 to Stumpf et al., whose disclosure is incorporated herein by reference, describes a method for preserving the order of data that is transferred from a first device to a second device. During a first cycle, a first block of data is transferred from the first to the second device, and is simultaneously stored in the first device. During a second cycle, a second block of data is transferred, and a signal is issued indicating success or failure of the first block transfer. In the event of failure, the first cycle repeats.

U.S. Pat. Nos. 5,742,792 and 6,502,205, both to Yanai et al., whose disclosures are incorporated herein by reference, describe a system which stores data received from a host to a primary data storage system, and additionally controls the copying of the data to a secondary data storage system. One or both of the primary and secondary data storage systems coordinate the copying of the data to the secondary data storage system, and maintain a list of the data which is to be copied to the secondary data storage device.

U.S. Pat. No. 5,900,020 to Safranek et al., whose disclosure is incorporated herein by reference, describes how a write operation begins with a request by a processor to invalidate copies of data stored in other nodes. The request is queued while acknowledging to the processor that the request is complete, even though it actually is not. The processor proceeds to complete the write operation by changing the data. The queued request, however, is not transmitted to other nodes until all previous invalidate requests by the processor are complete. The invalidate requests are added and removed from a processor's outstanding invalidate list as they arise and are completed.

U.S. Pat. No. 6,493,809 to Safranek et al., whose disclosure is incorporated herein by reference, describes a method for invalidating shared cache lines by issuing an invalidate acknowledgment before actually invalidating a cache line. An invalidate request is sent from a head node on a sharing list to a succeeding node on the list. In response to the request, the succeeding node issues an invalidate acknowledgment before the cache line is actually invalidated. After issuing the invalidate acknowledgment, the succeeding node initiates invalidation of the cache line.

SUMMARY OF THE INVENTION

It is an object of some aspects of the present invention to provide a method and apparatus for preserving order in a transaction processing system.

In a preferred embodiment of the present invention, a host transmits transactions indicative of data that is to be processed in a processing system comprising primary and secondary processing nodes. From the point of view of the host, transactions may be in "host-ordered" sets. Except for the first transaction in a host-ordered set, the host does not transmit a transaction of the set until the host has received an acknowledgment from the processing system of completion of the immediately preceding transaction of the set.

From the point of view of the processing system, things may appear somewhat different. The processing system treats a first and a second transaction as ordered if the first transaction completes before the second begins. Thus, any two transactions that are ordered from the point of view of the host, as described above, will also be ordered from the point of view of the system as described here. However, many additional pairs of transactions will appear to the system as relatively ordered, even though they were not originally treated by the host as ordered, simply because the first completed before the second began. Faced with a pair of ordered transactions, the system has no means to determine if they are ordered because they were originally "host-ordered" or just incidentally so. Therefore, a method is needed that will allow the system to process such transactions while preserving their order, as the system perceives it. This is done by means of batches of transactions.

The processing system delineates the incoming transactions into batches of non-ordered transactions. While a batch is open the system does not acknowledge any transaction even if its processing has been completed. As each batch is closed (and a new batch opens) the processing system may then acknowledge to the host any transaction in the batch whose processing has been completed. Once a batch is closed and the host receives an acknowledgment for a transaction that is comprised in a host-ordered set of transactions, the host is able to send a subsequent transaction in that ordered set. (The subsequent transaction will appear in a subsequent batch.)

Within the processing system, the transactions of the closed batch are processed in the primary node. The primary node generates records of transactions comprised in each batch, and these records are transmitted from the primary node to the secondary node. Data corresponding to the transactions is also transmitted from the primary node to the secondary node.

At the secondary node, transactions for the $N^{th}$ batch (N a whole number) are processed at the secondary node. In order to preserve the order of the transactions, no transactions from the $(N+1)^{th}$ batch are processed until all the transactions in the $N^{th}$ batch have been processed and acknowledged.

By arranging the transactions into batches comprising transactions that are not ordered with respect to each other, the batches behave in an asynchronous manner so that latency penalties are minimized. However, by ensuring that any two transactions that are ordered with respect to each other are placed in succeeding batches, order is preserved in each device of the processing system.

In some preferred embodiments of the present invention, the processing system acts as a storage system, wherein at least one of the nodes of the system comprises a storage node. For a node acting as a storage node, processing of a transaction typically comprises storing data associated with the transaction at the node.

In some preferred embodiments of the present invention, the primary node closes a batch when the node has completed any transaction of the batch, at which point a new batch begins. In an alternative preferred embodiment of the present invention, a batch closes (and a new batch begins) when the primary node receives a first acknowledgment of completion of a transaction from the secondary node. In a further alternative preferred embodiment of the present invention, a batch closes after a preset time, after which time the new batch begins. In a yet further alternative preferred embodiment of the present invention, batch closing is dynamic and is preferably conditioned on a performance parameter, such as a number of transactions completed, of the storage system.

In some preferred embodiments of the present invention, the processing system comprises more than one secondary node. Preferably, in this case, the primary node conveys the batch records to each secondary node. Each secondary node then processes its transactions substantially independently of the other secondary nodes as described above, so that for each secondary node no transactions of its $(N+1)^{th}$ batch are processed before all of the $N^{th}$ batch transactions have been processed.

There is therefore provided, according to a preferred embodiment of the present invention, a method for data mirroring including:

receiving a sequence of data transactions at a first storage node from a host indicating data to be stored by the first storage node;

storing the data in the first storage node responsively to the data transactions in the sequence;

delineating at the first storage node a first batch of the data transactions in the sequence;

returning to the host from the first storage node an acknowledgment of having stored the data in response to the data transactions in the first batch;

delineating at the first storage node a second batch of the data transactions in the sequence received from the host subsequent to the acknowledgment;

conveying the data from the first storage node to a second storage node;

conveying to the second storage node a first record of the data transactions in the first batch and a second record of the data transactions in the second batch; and storing the data in the second storage node responsively to the first and second records, so that all the data indicated by the data transactions in the first batch are stored by the second storage node prior to storing the data indicated by the data transactions in the second batch.

Preferably, delineating the first batch includes closing the first batch in response to receiving from the second storage node at the first storage node an acknowledgment of completion of a first prior data transaction comprised in the first batch, and delineating at the first storage node the second batch includes closing the second batch in response to receiving from the second storage node at the first storage node an acknowledgment of completion of a second prior data transaction comprised in the second batch.

Alternatively or additionally, delineating the first batch comprises delineating the first batch over of a first time period, and delineating the second batch comprises delineating the second batch over a second time period. Preferably, the first and the second time periods are approximately equal.

Preferably, delineating the first batch includes closing the first batch in response to a first number of the data transactions received from the host, and delineating the second batch comprises closing the second batch in response to a second number of the data transactions received from the host.

Preferably, conveying the data and conveying the first record and the second record include applying a first label indicative of the first batch to at least one of the data of the data transactions of the first batch, and applying a second label indicative of the second batch to at least one of the data of the data transactions of the second batch. Applying the first label preferably includes applying at least one of a first tag, a first flag, a first counter, a first identifier, and a first time stamp to the at least one of the data of the data transactions of the first batch, and applying the second label preferably includes applying at least one of a second tag, a second flag, a second counter, a second identifier, and a second time stamp to the at least one of the data of the data transactions of the second batch.

The method preferably includes conveying the first batch and the second batch to the secondary node, and most preferably, conveying the first batch and the second batch and conveying the first record and the second record include applying a first label indicative of the first batch to at least one of the data transactions of the first batch, and applying a second label indicative of the second batch to at least one of the data transactions of the second batch.

Alternatively or additionally, applying the first label includes applying at least one of a first tag, a first flag, a first counter, a first identifier, and a first time stamp to the at least one of the data transactions of the first batch, and applying the second label includes applying at least one of a second tag, a second flag, a second counter, a second identifier, and a second time stamp to the at least one of the data transactions of the second batch.

Preferably, the first storage node includes a first non-volatile memory and the second storage node includes a second non-volatile memory. Alternatively, the first storage node includes a volatile memory and the second storage node includes a non-volatile memory. Further alternatively, the first storage node includes a first volatile memory and the second storage node includes a second volatile memory. Alternatively, the first storage node includes a non-volatile memory and the second storage node includes a volatile memory.

Preferably, the first batch includes a first plurality of the data transactions, and the second batch includes a second plurality of the data transactions.

Further preferably, delineating the first batch includes closing the first batch in response to completing at the first storage node at least one of the data transactions included in the first batch, and delineating the second batch includes closing the second batch in response to completing at the first storage node at least one of the data transactions included in the second batch.

There is further provided, according to a preferred embodiment of the present invention, apparatus for data mirroring, including:

a first storage node which is adapted to:

receive a sequence of data transactions from a host indicating data to be stored in the first storage node, store the data responsively to the data transactions in the sequence, delineate a first batch of the data transactions in the sequence, return to the host an acknowledgment of having stored the data in response to the data transactions in the first batch, and delineate a second batch of the data transactions in the sequence received from the host subsequent to the acknowledgment; and a second storage node which is adapted to:

receive the data from the first storage node, receive from the first storage node a first record of the data transactions in the first batch and a second record of the data transactions in the second batch, and store the data responsively to the first and second records, so that all the data indicated by the data transactions in the first batch are stored prior to storing the data indicated by the data transactions in the second batch.

Preferably, delineating the first batch includes closing the first batch in response to receiving from the second storage node, at the first storage node, an acknowledgment of completion of a first data transaction included in the first batch, and delineating the second batch includes closing the second batch in response to receiving from the second storage node, at the first storage node, an acknowledgment of completion of a second data transaction included in the second batch.

Alternatively or additionally, delineating the first batch includes delineating the first batch over a first time period, and delineating the second batch includes delineating the second batch over a second time period. Further preferably, the first and the second time periods are approximately equal.

Preferably, delineating the first batch includes closing the first batch in response to a first number of the data transactions received from the host, and delineating the second batch includes closing the second batch in response to a second number of the data transactions received from the host.

Further preferably, the first record includes a first label indicative of the first batch applied to at least one of the data of the data transactions of the first batch and the second record includes a second label indicative of the second batch applied to at least one of the data of the data transactions of the second batch.

The first label preferably includes at least one of a first tag, a first flag, a first counter, a first identifier, and a first time stamp applied to the at least one of the data of the data transactions of the first batch, and the second label preferably includes at least one of a second tag, a second flag, a second counter, a second identifier, and a second time stamp applied to the at least one of the data of the data transactions of the second batch.

Preferably, the first storage node is adapted to convey the first batch and the second batch to the secondary node.

The first storage node is preferably adapted to apply a first label indicative of the first batch to at least one of the data transactions of the first batch, and to apply a second label indicative of the second batch to at least one of the data transactions of the second batch. Preferably, the first label includes at least one of a first tag, a first flag, a first counter, a first identifier, and a first time stamp applied to the at least one of the data transactions of the first batch, and the second label includes at least one of a second tag, a second flag, a second counter, a second identifier, and a second time stamp applied to the at least one of the data transactions of the second batch.

Preferably, the first storage node includes a first non-volatile memory and the second storage node includes a second non-volatile memory. Alternatively, the first storage node includes a volatile memory and the second storage node includes a non-volatile memory. Further alternatively, the first storage node includes a first volatile memory and the second storage node includes a second volatile memory. Alternatively, the first storage node includes a non-volatile memory and the second storage node includes a volatile memory.

Preferably, the first batch includes a first plurality of the data transactions, and the second batch includes a second plurality of the data transactions.

Delineating the first batch preferably includes closing the first batch in response to completing at the first storage node at least one of the data transactions included in the first batch, and delineating the second batch includes closing the second batch in response to completing at the first storage node at least one of the data transactions included in the second batch.

There is further provided, according to a preferred embodiment of the present invention, a method for processing data transactions including:

receiving a sequence of data transactions at a first processing node from a host;

delineating at the first processing node a first batch of the data transactions in the sequence;

returning to the host from the first processing node an acknowledgment of having delineated the data transactions in the first batch;

delineating at the first processing node a second batch of the data transactions in the sequence received from the host subsequent to the acknowledgment;

conveying the sequence of data transactions from the first processing node to a second processing node;

conveying to the second processing node a first record of the data transactions in the first batch and a second record of the data transactions in the second batch; and processing the data transactions in the second processing node responsively to the first and second records, so that all the data transactions in the first batch are processed by the second processing node prior to processing the data transactions in the second batch.

Preferably, the data transactions include respective data associated therewith, and conveying the sequence of data transactions from the first processing node to the second processing node includes conveying the respective data from the first processing node to the second processing node, and processing the data transactions in the second processing node includes storing the respective data in the second processing node so that all the data associated with the data transactions in the first batch are stored prior to storing the data associated with the data transactions in the second batch.

Preferably, conveying to the second processing node the first record of the data transactions in the first batch and the second record of the data transactions in the second batch includes applying a first label indicative of the first batch to at least one of the data transactions of the first batch, and applying a second label indicative of the second batch to at least one of the data transactions of the second batch.

There is further provided, according to a preferred embodiment of the present invention, apparatus for processing data transactions including:

a first processing node which is adapted to:

receive a sequence of data transactions from a host, delineate at the first processing node a first batch of the data transactions in the sequence, return to the host from the first processing node an acknowledgment of having delineated the data transactions in the first batch, and delineate at the first processing node a second batch of the data transactions in the sequence received from the host subsequent to the acknowledgment; and a second processing node which is adapted to:

receive the sequence of data transactions from the first processing node, receive from the first processing node a first record of the data transactions in the first batch and a second record of the data transactions in the second batch, and process the data transactions in the second processing node responsively to the first and second records, so that all the data transactions in the first batch are processed by the second processing node prior to processing the data transactions in the second batch.

Preferably, the data transactions include respective data associated therewith, and receiving the sequence of data transactions at the first processing node includes conveying the respective data from the first processing node to the second processing node, and processing the data transactions in the second processing node includes storing the respective data in the second processing node so that all the data associated with the data transactions in the first batch are stored prior to storing the data associated with the data transactions in the second batch.

The first record of the data transactions in the first batch preferably includes a first label indicative of the first batch applied to at least one of the data transactions of the first batch, and the second record of the data transactions in the second batch preferably includes a second label indicative of the second batch applied to at least one of the data transactions of the second batch.

The present invention will be more fully understood from the following detailed description of the preferred embodiments thereof, taken together with the drawings, a brief description of which follows.

DETAILED DESCRIPTION OF PREFERRED EMBODIMENTS

Figure 1:
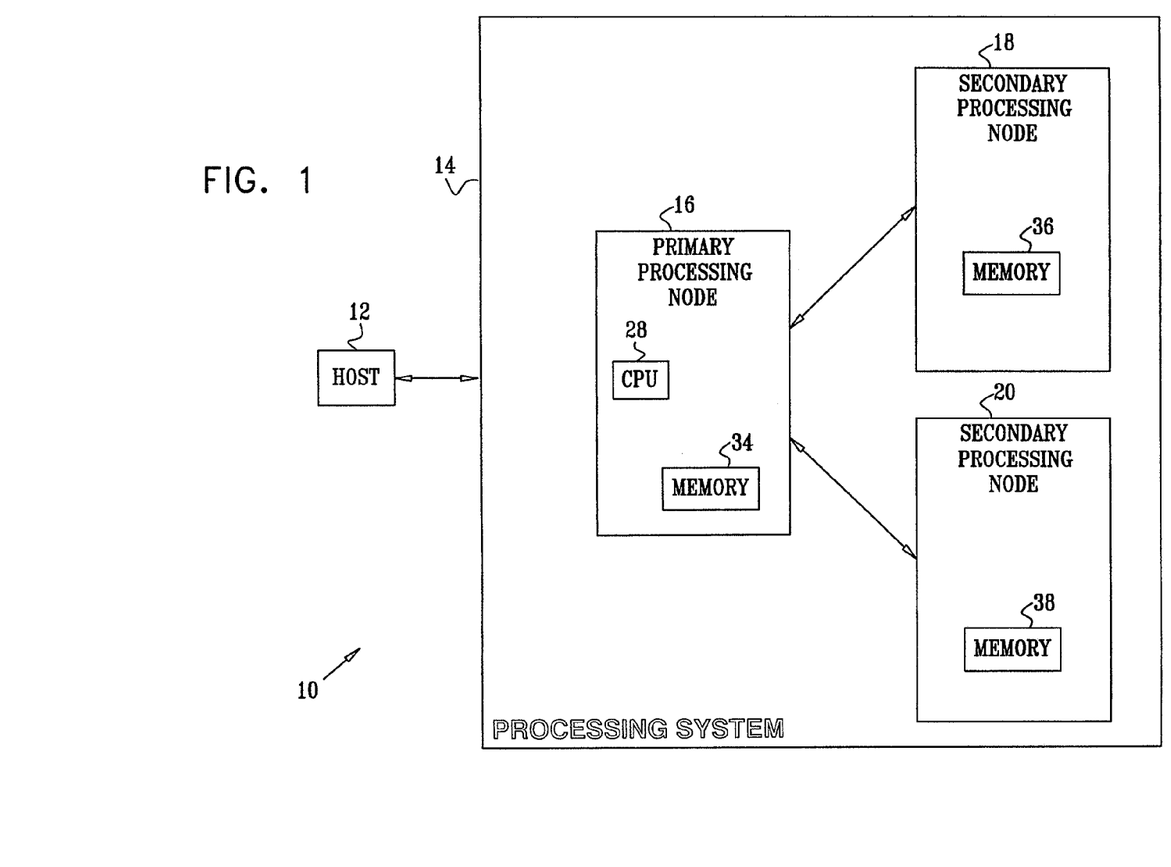
FIG. 1 is a schematic illustration of an order-preserving transaction processing arrangement, according to a preferred embodiment of the present invention.

Reference is now made to FIG. 1, which is a schematic illustration of an order-preserving transaction processing arrangement 10, according to a preferred embodiment of the present invention. Arrangement 10 comprises a host computer 12 which is coupled to a processing system 14. Processing system 14 comprises a plurality of generally similar processing nodes 16 and 18, which process data according to data transactions performed by the host. A data transaction, also herein termed a transaction, comprises a unit of work, initiated with a request and completed with a response, which in turn comprises one or more operations. Each operation may have associated data, and a typical transaction comprises an operation where data is read or modified, such as writing data to, or reading data from, a memory. The coupling between host 12 and system 14, and between nodes 16, 18, within the system, may be by any suitable data transfer method known in the art, including, but not limited to wired, wireless, optical cabling, and coaxial cabling coupling.

Each node 16, 18, of system 14 may be configured as either a transaction processing node, or as a data storage node, or as a node wherein transactions are processed and data is stored. By way of example, system 14 is assumed to mirror transactions and data of host 12. Also by way of example, nodes 16 and 18 are hereinbelow assumed both to process transactions and to store data associated with the transactions, and the nodes are also referred to as storage nodes. It will be appreciated, however, that the scope of the present invention comprises nodes that are configured to only process transactions or to only store data.

Nodes 16, 18 each respectively comprise a memory 34, 36. Memories 34, 36 may comprise volatile or non-volatile memory, or a combination of both volatile and non-volatile memory. Typically, volatile memory comprises a random access memory (RAM), which is typically used by the node as a cache for temporary storage of data indicated by the transactions within the node; and non-volatile memory comprises a magnetic disk which is typically used by the node to permanently store the data.

Storage node 16 is assumed to act as a primary storage node for the host, and is herein also termed the primary storage node. Storage node 18 is assumed to act as a secondary storage node, and is herein also termed the secondary storage node.

In some preferred embodiments of the present invention, system 14 comprises more than one secondary node, each generally similar to node 18. For example system 14 may comprise a secondary node 20 comprising a memory 38, substantially similar to memory 34 or 36. Except where otherwise stated hereinbelow, system 14 is assumed, by way of example, to comprise two secondary nodes 18 and 20.

Typically, the primary storage node is local to host 12, and at least one of the secondary nodes is remote from the host. It will be appreciated, however, that operation of storage system 14 is substantially independent of the location of any of the nodes of the system with respect to each other or with respect to host 12. System 14 comprises at least one central processing unit (CPU) 28 which performs operations for the system, and which is typically located at one of the storage nodes. Herein, by way of example, CPU 28 is assumed to be located at storage node 16.

It will be appreciated that the configuration described above for system 14 encompasses a number of different physical processing systems that have two or more nodes for the processing of transactions and/or the storage of data. As a first example, node 16 comprises volatile memory used as a cache, and nodes 18 and 20 comprise disks. A configuration such as the first example is typically that of a single computer. As a second example, nodes 16, 18, and 20 each comprise volatile memory used as a cache and non-volatile memory, and in this case each node typically comprises a CPU to operate the node. A configuration such as the second example is typically that of three computers coupled together. Other examples of configurations of system 14, comprising two or more nodes coupled together, will be apparent to those skilled in the art; all such configurations are considered to be within the scope of the present invention.

Figure 2:
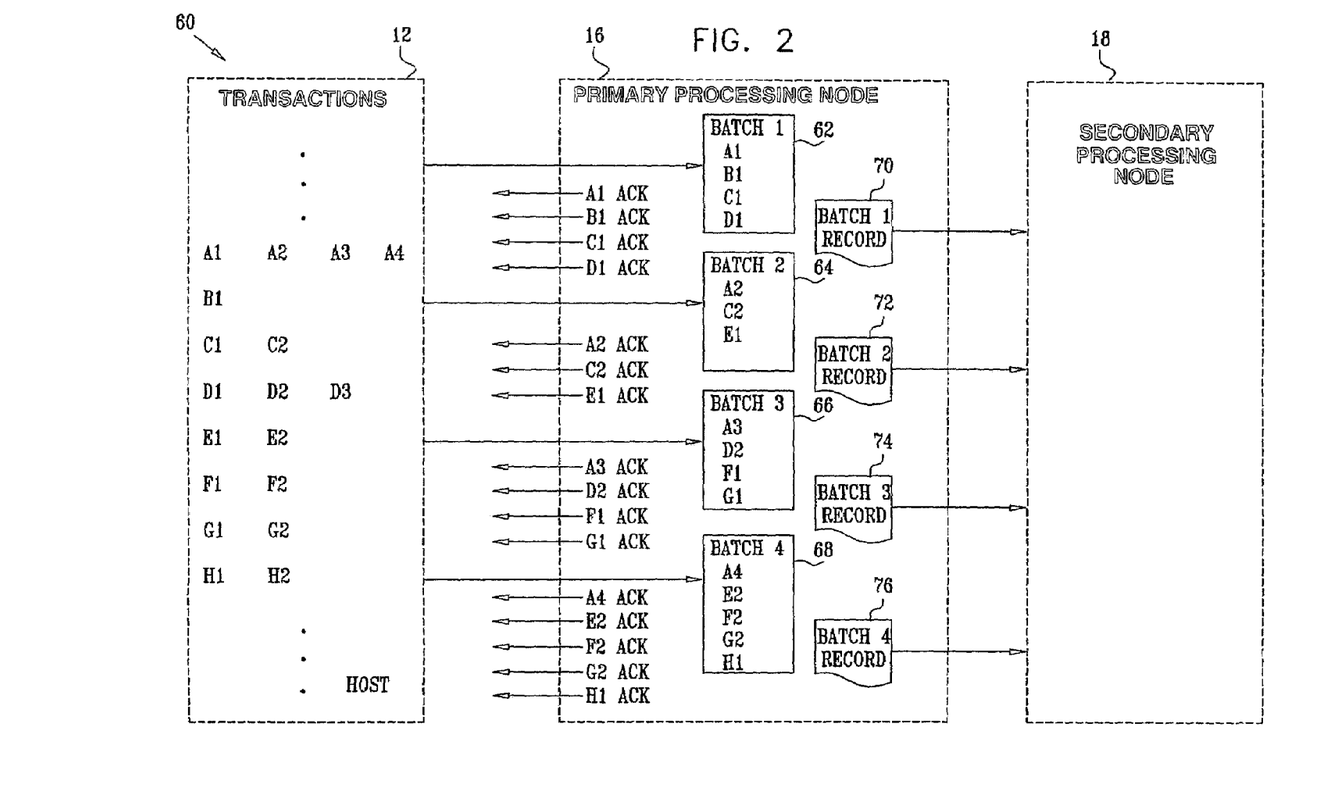
FIG. 2 is a schematic illustration of data transactions that indicate data that is to be stored by a host in nodes of the arrangement of FIG. 1, according to a preferred embodiment of the present invention.

FIG. 2 is a schematic illustration of data transactions that indicate data that is to be stored by host 12 in the storage nodes of system 14, according to a preferred embodiment of the present invention. Host 12 is to store data corresponding to a group 60 of transactions, represented as A1, A2, A3, A4, B1, C1, C2, . . . in the storage nodes. Some of group 60 comprise transactions which host 12 commits in a sequential fashion with respect to each other, and which system 14 treats as ordered. Transactions such as A1, A2, A3, A4 are also termed herein "host-ordered" transactions. System 14 treats any two transactions A,B as ordered if B completes before A begins. The notation used herein for transactions is that all transactions Xn, where n is a whole number and X is a letter of the alphabet, are ordered with respect to each other, so that data to be stored by a transaction Xn must complete, i.e., must store successfully, before data of transaction Xn+1 begins to store. Furthermore, any transaction Xn is not assumed to be ordered with respect to a transaction Yn, so that data stored by these transactions may be stored in any order. Thus, in group 60, A1, A2, A3, A4, are ordered with respect to each other, but none are ordered with respect to B1, C1, or C2. Using the notation described in the Background of the Invention, (A1, A2, A3, A4)$_o$, and (A1, B1)$_{no}$. Typically, but not necessarily, the data to be stored is for data transactions that are performed at an application level, so that, for example, transactions A1, A2, A3, A4 may be from one application such as a text editing application, and C1, C2 may be from a second application such as a graphics application.

Initially host 12 sends transactions, and their respective data, from group 60 to system 14. The host may send any initial transaction of a host-ordered set of transactions; for any subsequent transaction in a host-ordered set the host waits to receive an acknowledgment of completion of the immediate prior transaction in the set before sending the subsequent transaction to system 14.

According to a predetermined criterion, described in more detail below, CPU 28 declares some of the received transactions a "closed" batch, and, preferably, begins storing the data of the transactions of the batch to memory 34. As is also described in more detail below, while receiving the transactions of the batch, CPU 28 also begins storing the data of the transactions comprised in the batch to memories 36 and 38.

By way of example, a first closed batch 62 is assumed to comprise transactions A1, B1, C1, and D1. On closure of the batch, CPU 28 is able to acknowledge completion of each of the transactions of the first batch to host 12, as each of the transactions completes in primary node 16. The individual acknowledgments are indicated in FIG. 2 by adding a suffix ACK to the transaction designation.

Once it has received an acknowledgment of a transaction in the first batch, host 12 is able to send a transaction, and its data, which is host-ordered with respect to the acknowledged transaction, as well as transactions and data which are not host-ordered with respect to any that have already been sent or that are in the process of being sent. By way of example, host 12 sends second transactions including A2, C2, and E1, for storage in system 14, after which system 14 declares A2, C2, and E1 a second closed batch 64. It will be understood that host 12 is not able to send A3 or A4 and their data, since it has received no acknowledgment that A2 or A3 have been received by system 14. As each of transactions A2, C2, and E1 completes in node 16, CPU 28 sends respective acknowledgments to host 12.

Host 12 continues to send transactions and data to system 14 for storage of the data in the memories of the system, the transactions being "batched" at the primary node. From these transactions and data CPU 28 forms, in substantially the same manner as the first two batches were formed, a third batch 66 comprising transactions A3, D2, F1, and G1, which the CPU acknowledges to host 12. CPU 28 then forms a fourth batch 68 comprising transactions A4, E2, F2, G2, and H1, which the CPU acknowledges to host 12. It will be appreciated that no transaction which is ordered, or the data corresponding to the transaction, is sent by host 12 unless the host has received an acknowledgment of completion of the prior transaction in the order. It will also be appreciated that the process described hereinabove intrinsically generates batches so that within each batch no transactions are ordered with respect to each other.

Once the transactions have been delineated into batches at the primary node, CPU 28 attempts to store the data of the transactions in each of secondary storage nodes 18, 20. For each batch the primary node generates respective batch records 70, 72, 74, 76, of transactions within the batch, and these records are conveyed to the secondary nodes. Batch records 70, 72, 74, 76, are also referred to respectively herein as records of batch 1, batch 2, batch 3, batch 4. The batch transactions and their data are conveyed to the secondary storage nodes 18, 20 in substantially any convenient order, and are temporarily held in respective memories 36, 38. Each secondary storage node 18, 20 then processes the received transactions, i.e., stores the data corresponding to the transactions to respective memories 36 and 38.

In order to preserve order in the transactions being processed, respective nodes 18, 20 use the batch records received to ensure that no data from a transaction in a batch N+1 (N a whole number) is stored until all transactions of batch N have been successfully completed. Since within any specific batch none of the transactions are ordered with respect to each other, the order in which the data of transactions within the batch are stored to each secondary storage node is substantially immaterial. However, because batches are operated on in order, the order of transactions which are ordered with respect to each other is preserved.

It will be understood that the batch records generated by the primary node may comprise substantially any suitable method of labeling of data and/or transactions that indicate a specific batch to which the data and/or transactions belong. For example, the batch records may comprise one or more tags, flags, counters, identifiers, or time stamps which are applied to individual data and/or a corresponding individual transaction to indicate to which batch the data and/or transaction belongs. As a further example, the batch records may comprise a label applied or appended to one or more sets of data and/or transactions to indicate to which batch the sets belong. The batch records and/or labels may be conveyed together with or separately from their associated data and/or transactions. Other forms of batch record, indicating to which batch data and transactions belong, will be apparent to those skilled in the art; all such forms of batch records are assumed to be comprised within the scope of the present invention.

Once a specific secondary node 18, 20, has successfully stored data for a transaction in its memory, it is able to acknowledge the transaction completion to node 16.

In some preferred embodiments of the present invention, CPU 28 closes each batch as soon as it has completed a transaction of the batch in primary node 16. In an alternative preferred embodiment, CPU 28 closes each batch as soon as it receives acknowledgments of successful completion of a specific transaction of that batch from all of the secondary nodes present in system 14. In a further alternative preferred embodiment, CPU 28 closes each batch after expiry of a substantially fixed time period, such as 1 ms. In another alternative preferred embodiment, CPU 28 closes each batch according to a performance parameter of arrangement 10, such as after host 12 has transferred a fixed or a variable number of transactions to system 14. Other suitable methods for closing batches will be apparent to those skilled in the art. All such methods are assumed to be comprised within the scope of the present invention.

It will be appreciated that the method describing data storage in primary node 16, and in secondary nodes 18 and 20, intrinsically maintains any order generated by host 12 in which the data is to be stored. Thus, in the event of a failure of any of the primary or secondary nodes, there will be substantially no inconsistency in the overall system when the failed node or nodes recover. Furthermore, any lack of completeness that occurs is completely repairable, since all data in each storage node has been stored, and all transactions have been processed, in an order-preserving manner.

If batches are closed after a relatively short period of time, e.g., 1 ms, then in the event of a failure there is very little difference between the states of the primary and secondary nodes. However, regardless of the method for closing the batches, it will be appreciated that preferred embodiments of the present invention incorporate the latency advantages of asynchronous systems with the order preserving advantages of synchronous systems.

As stated above, each node 16, 18 may be configured as a transaction processing and/or data storage node. It will thus be appreciated that in a preferred embodiment of the present invention, node 16 may be configured substantially only to process transactions and their associated data, if such exist. In this case the processing at node 16 substantially comprises delineation of batches, and conveyance of the results of the delineations to the host and one or more nodes 18, as is described above.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for data mirroring comprising:
   compiling a first and a second batch of transactions, wherein each batch includes a separate set of transactions, and wherein transactions in the first batch are acknowledged after the first batch is closed;
   generating a record indicating the transactions in the first batch, said record being usable by a mirroring system to determine when all the transactions in the first batch have been processed; and
   transmitting the first and second batches and the record to the mirroring system;
   wherein batches are delineated based on a factor selected from the group consisting of time, number of transactions, overall data size and external triggers.

2. The method according to claim 1, wherein processing a transaction includes a process selected from the group consisting of caching data, storing data, and deleting data.

3. The method according to claim 1, further including generating and transmitting a record indicating the transactions in the second batch.

4. A method for data mirroring comprising:
   receiving at a mirroring system a first and a second batch of transactions, wherein each batch includes a separate set of transactions;
   receiving at the mirroring system a record indicating the data transactions in the first batch; and
   using the record to determine when all transactions in the set of transactions of the first batch have been processed such that processing of the data transactions in the second batch may be initiated;
   wherein batches are delineated based on a factor selected from the group consisting of time, number of transactions, overall data size and external triggers.

5. The method according to claim 4, wherein processing a transaction includes a process selected from the group consisting of caching data, storing data, and deleting data.

6. The method according to claim 4, wherein a second record and a third batch are received and the second record is used to determine when all transactions in the set of transactions of the second batch have been processed such that processing of the data transactions in the third batch may be initiated.

7. A primary data storage system comprising:
   a controller adapted to compile a first and a second batch of transactions, wherein each batch includes a separate set of transactions, and wherein said controller acknowledges transactions in the first batch after the first batch is closed; and
   said controller further adapted to generate a record indicating the transactions in the first batch, said record being usable by a mirroring system to determine when all the transaction in the first batch have been processed;
   wherein the first and second batches and the record are transmitted to the mirroring system; and
   wherein batches are delineated based on a factor selected from the group consisting of time, number of transactions, overall data size and external triggers.

8. The system according to claim 7, wherein processing a transaction includes a process selected from the group consisting of caching data, storing data, and deleting data.

9. The system according to claim 7, further including generating and transmitting a record indicating the transactions in the second batch.

10. A data mirroring system comprising:
    a system controller adapted regulate the processing of received transactions and to use the one or more records in determining when all transactions in the set of transaction of the first batch have been processed such that processing of the data transactions in the second batch may be initiated; and
    a mass data storage device adapted to store transactions received by said communication module and processed by said controller;
    wherein the system is adapted to receive a first and a second batch of data transactions, wherein each batch of data transactions includes a set of transactions, and wherein said system is further adapted to receive one or more records of the data transactions in the first batch and the data transactions in the second batch; and
    wherein batches are delineated based on a factor selected from the group consisting of time, number of transactions, overall data size and external triggers.

11. The system according to claim 10, wherein processing a transaction includes a process selected from the group consisting of caching data, storing data, and deleting data.

12. The system according to claim 10, wherein a third batch is received and the second record is used to determine when all transactions in the set of transactions of the second batch have been processed such that processing of the data transactions in the third batch may be initiated.

13. A method for data mirroring comprising:
    at primary storage node:
    (a) compiling a first and a second batch of transactions, wherein each batch includes a separate set of transactions, and wherein transactions in the first batch are acknowledged after the first batch is closed;
    (b) generating a record indicating the transactions in the first batch, said record being usable by a mirroring system to determine when all the transactions in the first batch have been processed; and
    (c) transmitting the first and second batches and the record to the mirroring system;
    at a mirroring storage node:
    (a) receiving at a mirroring system a first and a second batch of transactions, wherein each batch includes a separate set of transactions;
    (b) receiving at the mirroring system a record indicating the data transactions in the first batch; and
    (c) using the record to determine when all transactions in the set of transaction of the first batch have been processed such that processing of the data transactions in the second batch may be initiated;
    wherein batches are delineated based on a factor selected from the group consisting of time, number of transactions, overall data size and external triggers.

14. The method according to claim 13, wherein processing a transaction includes a process selected from the group consisting of caching data, storing data, and deleting data.

15. The method according to claim 13, further including generating and transmitting a record indicating the transactions in the second batch.

16. The method according to claim 13, wherein a second record and a third batch are received and the second record transactions of the second batch have been processed such that processing of the data transactions in the third batch may be initiated.

17. A distributed data storage system comprising:
    (a) a primary storage node comprising:
       (i) a controller adapted to compile a first and a second batch of transactions, wherein each batch includes a separate set of transactions, and wherein said controller acknowledges transactions in the first batch after the first batch is closed; and
       (ii) said controller further adapted to generate a record indicating the transactions in the first batch, said record being usable by a mirroring system to determine when all the transactions in the first batch have been processed;
       (iii) wherein said primary storage node is adapted to transmit the first and second batches and the record to the mirroring system; and
    (b) a mirroring storage node comprising:
       (i) a system controller adapted regulate the storage of received transactions and to use the one or more records in determining when all transactions in the set of transactions of the first batch have been processed such that processing of the data transactions in the second batch may be initiated; and
       (ii) a mass data storage device adapted to store transactions received by said communication module and processed by said controller;
       (iii) wherein said mirroring storage node is adapted to receive a first and a second batch of data transactions, wherein each batch of data transactions includes a set of transactions, and wherein said mirroring storage node is further adapted to receive one or more records of the data transactions in the first batch and the data transactions in the second batch;

wherein batches are delineated based on a factor selected from the group consisting of time, number of transactions, overall data size and external triggers.

18. The system according to claim 17, wherein processing a transaction includes a process selected from the group consisting of caching data, storing data, and deleting data.

19. The system according to claim 17, further including generating and transmitting a record indicating the transactions in the second batch.

20. The system according to claim 17, wherein a third batch is received by said communication module and the second record is used to determine when all transactions in the set of transactions of the second batch have been processed such that processing of the data transactions in the third batch may be initiated.

* * * * *